United States Patent
Matsumoto

(10) Patent No.: US 8,359,617 B2
(45) Date of Patent: Jan. 22, 2013

(54) APPARATUS FOR PROCESSING ELECTRONIC PROGRAM GUIDE INFORMATION, SYSTEM FOR RECEIVING DIGITAL BROADCASTS, AND METHOD FOR PROCESSING PROGRAM INFORMATION

(75) Inventor: Takashi Matsumoto, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 1072 days.

(21) Appl. No.: 12/277,711

(22) Filed: Nov. 25, 2008

(65) Prior Publication Data

US 2009/0144770 A1    Jun. 4, 2009

(30) Foreign Application Priority Data

Nov. 28, 2007   (JP) ................. 2007-306995

(51) Int. Cl.
    H04N 5/445   (2006.01)
    H04N 7/16    (2006.01)
    G06F 3/00    (2006.01)
    G06F 13/00   (2006.01)
    G06F 11/00   (2006.01)
    H04M 3/42    (2006.01)
    G01R 31/08   (2006.01)
    G08C 15/00   (2006.01)
    H04J 1/16    (2006.01)
    H04L 1/00    (2006.01)
    H04L 12/26   (2006.01)

(52) U.S. Cl. ............. 725/54; 725/39; 725/55; 725/62; 455/414.1; 370/232

(58) Field of Classification Search ............... None
See application file for complete search history.

(56) References Cited

U.S. PATENT DOCUMENTS

| | | | |
|---|---|---|---|
| 6,005,561 A * | 12/1999 | Hawkins et al. | 715/234 |
| 6,904,609 B1 * | 6/2005 | Pietraszak et al. | 725/39 |
| 6,937,171 B2 * | 8/2005 | Baldwin et al. | 341/87 |
| 7,779,154 B2 * | 8/2010 | Lipsanen et al. | 709/239 |
| 7,818,769 B2 * | 10/2010 | Peacock et al. | 725/54 |

FOREIGN PATENT DOCUMENTS

| | | |
|---|---|---|
| JP | 10-304269 A | 11/1998 |
| JP | 2005-085174 | 3/2005 |

\* cited by examiner

Primary Examiner — Mark D Featherstone
(74) Attorney, Agent, or Firm — Mattingly & Malur, PC

(57) ABSTRACT

A apparatus for processing EPG information that EPG (Electronic Program Guide) information can be read prior to display independently of an operation by an input device. The EPG information processing apparatus controls the amount of EPG information stored in a database prior to display so that the speed of acquiring EPG information and the speed of supplying EPG information indicating the frequency of using an acquired electronic program guide are kept in a predetermined relation. In response to a direction for updating an on-display electronic program guide, the EPG processing apparatus supplies new EPG information, and stores another piece of EPG information associated with the EPG information in the database prior to next display. The amount of information stored in the database in advance is decided so that the acquiring speed and supplying speed can be kept in a predetermined relation. Therefore, the amount of information stored in advance is raised with increase in the frequency of using an electronic program guide in correlation with the acquired supplying speed, and the amount of information stored in advance is decreased with decrease in the using frequency.

16 Claims, 9 Drawing Sheets

Fig. 6
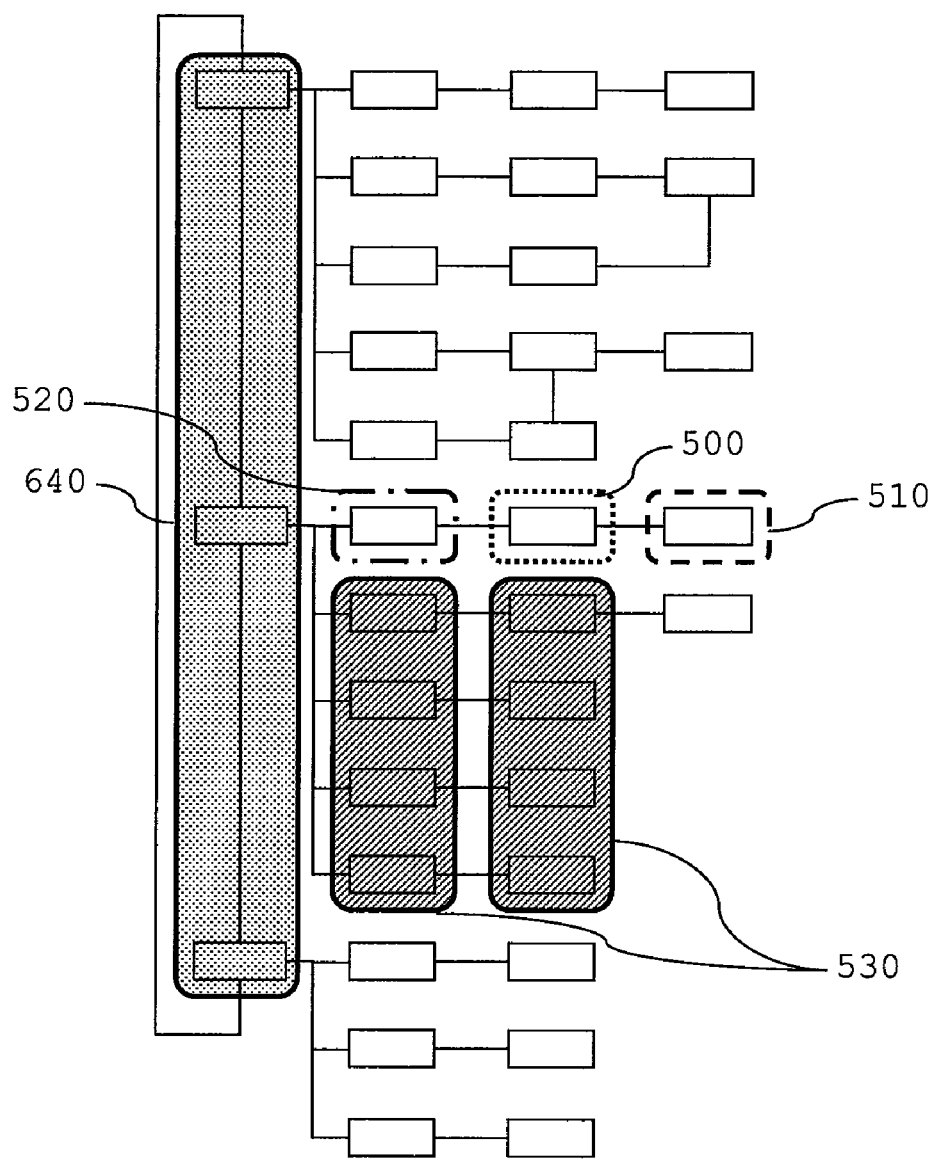
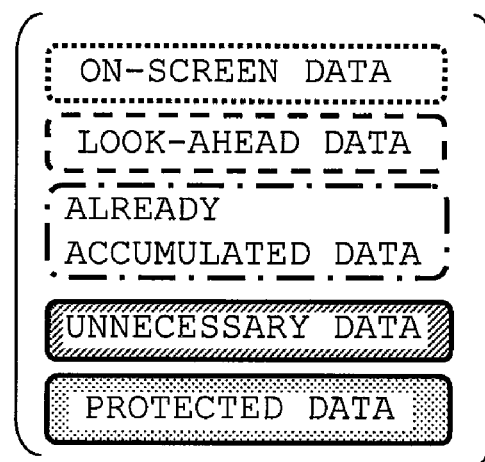

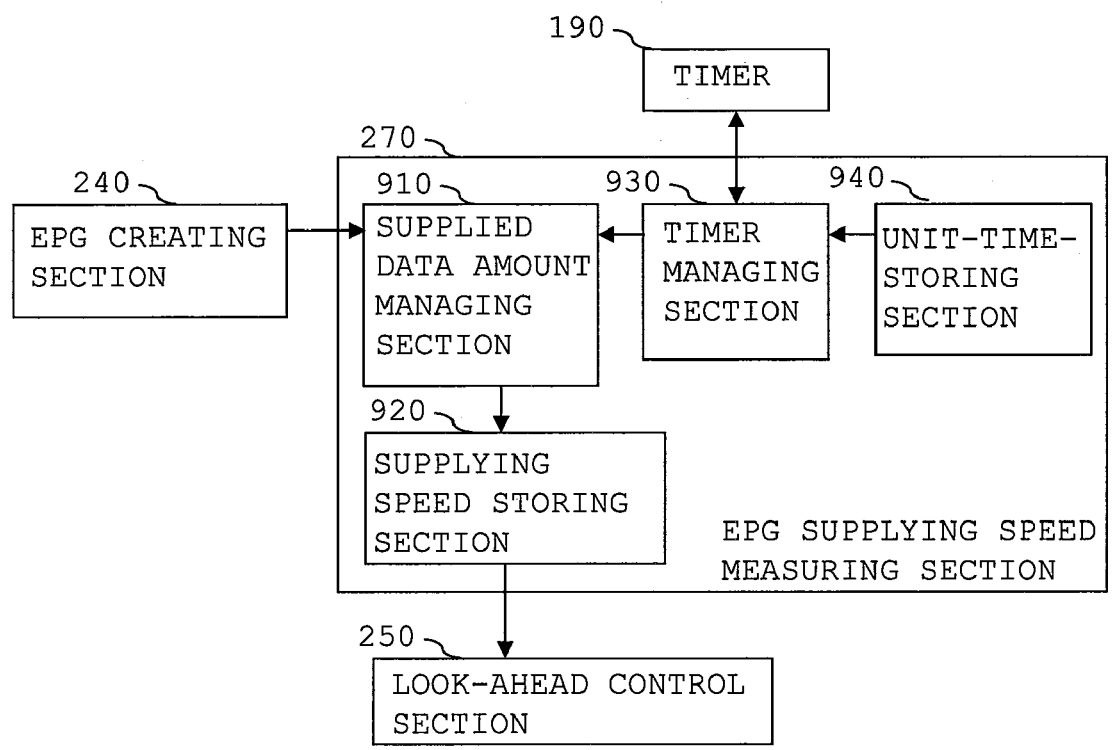

APPARATUS FOR PROCESSING ELECTRONIC PROGRAM GUIDE INFORMATION, SYSTEM FOR RECEIVING DIGITAL BROADCASTS, AND METHOD FOR PROCESSING PROGRAM INFORMATION

CLAIM OF PRIORITY

The Present application claims priority from Japanese application JP 2007-306995 filed on Nov. 28, 2007, the content of which is hereby incorporated by reference into this application.

BACKGROUND OF THE INVENTION

The present invention relates to an apparatus for processing EPG (Electronic Program Guide) information, a method for processing EPG information and a system for receiving digital broadcasts, which are used in reception of television programs and the like. More particularly, it relates to means which are useful in application to e.g. digital television sets.

Digitization of television and radio broadcasts have been promoted in various countries including Japan. Systems for digital broadcasting include ATSC (Advanced Television Systems Committee) of the U.S., DVB (Digital Video Broadcasting) of Europe, and ISDB (Integrated Services Digital Broadcasting) of Japan. Digital broadcasting is characterized by various types of data capable of being multiplexed in addition to contents data including moving picture data and audio data. Such function is used to deliver pertinent information including a program schedule, which is generically referred to as "electronic program guide" or "EPG" for short, and the license information, participants, outline and home page URL of each program. Thus, the convenience of audience is enhanced.

Further, in the field of mobile devices including portable telephones, terminals which allow users to receive digital broadcasts have been in common use. For example, in Japan, a one-segment partial reception service of ISDB-T (Integrated Services Digital Broadcasting for Terrestrial), commonly known as "one-segment broadcasting" is ubiquitous; and in other countries including Europe, a service such as DVB-H (Digital Video Broadcasting for Handheld) has been started.

Mobile devices are inferior to stationary television sets and PCs (Personal Computers) in hardware performances such as performance of CPUs (Central Processing Units) and capacity of RAMs (Random Access Memories). Digital broadcasting for mobile devices requires a smaller amount of information to be handled in comparison to typical digital broadcasts, however it needs some arrangement in respect of implementation for the purpose of providing users with a comfortable usage environment because of the hardware restriction as described above. Particularly, implementation of electronic program guides, which has a large impact on the user-friendliness, is important.

Electronic program guide data is divided and multiplexed into contents data, and intermittently carried to receiver terminals on airwaves. A receiver terminal, which is going to use an electronic program guide, usually separates EPG data and contents data from received broadcast data, analyzes and organizes information stored in the EPG data, and then constructs a database on RAM. The resultant electronic program guide database is used to prepare an electronic program guide, which will be supplied to users.

It is difficult to accumulate all the information at the time of construction of an electronic program guide database because the capacity of RAM is finite. However, EPG data is multiplexed into contents data and delivered intermittently, and therefore when a user attempts to acquire required information from time to time, a longer time is required to prepare an electronic program guide to be supplied to the user, and consequently the convenience for the user is ruined. Hence, to cope with such problem, a means termed "look-ahead", by which information likely to be required is acquired in advance, has been used usually.

JP-A-2005-85174 has proposed a technique of such look-ahead. According to the technique, the range to look in advance is determined by computing based on the trail of displacement of a mouse cursor which a user is handling, and the user preferentially gains information more likely to be looked subsequently.

SUMMARY OF THE INVENTION

However, in cases of consumer-oriented devices including television sets, selection is often made by simply operating a keyboard used as an input device without using a cursor. For instance, a technique that numeric keys "0" to "9" are used as shortcut keys, by which different link destinations are directly referred to respectively, is adopted. In this case, no cursor is present on a screen, and therefore the trail of displacement of a cursor cannot be used. In addition, mobile devices including portable telephones often use a touch panel as an input device. In such cases, a user takes the means of touching an appropriate point on a touch panel, which is required for input. As a result, a technique using the trail of displacement, which is a series of information, cannot be applied because a cursor is present on a screen, but discretely moving thereon.

Therefore, it is an object of the invention to provide an apparatus for processing EPG information, which allows EPG information to be looked ahead of display independently of an operation of an input device.

It is another object of the invention to provide a method for processing electronic EPG information, which can smooth display of an electronic program guide performed in response to a direction.

It is another object of the invention to provide a system for receiving digital broadcasts, which can smooth display of an electronic program guide performed in response to a direction.

The above and other objects of the invention and novel features hereof will be apparent from the description hereof and the accompanying drawings.

Now, of embodiments herein disclosed, preferred ones will be outlined below.

The apparatus for processing EPG information controls the amount of EPG information stored in the database in advance of display so that the speed of acquiring EPG information and the speed of supplying EPG information indicating the frequency of using an electronic program guide which has been acquired are kept in a predetermined relation. On receipt of a direction for updating an electronic program guide kept showing up on a display, the EPG processing apparatus supplies new EPG information, and stores information of another electronic program guide associated with the EPG information in advance of next display. The amount of information stored in the database in advance is decided so that the acquiring speed and supplying speed are kept in a predetermined relation. Therefore, the amount of information stored in advance is raised with increase in the frequency of using an electronic program guide in correlation with the acquired supplying speed, and the amount of information stored in advance is decreased with decrease in the using frequency.

The effect achieved by the preferred embodiments will be described below briefly.

EPG information can be looked ahead to display independently of an operation of an input device. Thus, in regard to consumer-oriented and mobile devices designed in view of using no mouse, it becomes possible to materialize an effective look-ahead function and a preceding storage function.

BRIEF DESCRIPTION OF THE DRAWINGS

These and other features, objects and advantages of the present invention will be come more apparent from the following description when taken in conjunction with the accompanying drawings wherein:

FIG. 1 is a block diagram showing an example of the configuration of a system for receiving digital broadcasts, which the invention is applied to;

FIG. 6 is an illustration for explaining the structure of an electronic program guide and details of processing of the elements thereof, showing a fourth condition;

FIG. 9 is a block diagram showing an example of the configuration of an EPG supplying speed measuring section of the EPG processing section.

DESCRIPTION OF THE EMBODIMENTS

1. Outlines of the Embodiments

Figure 1:
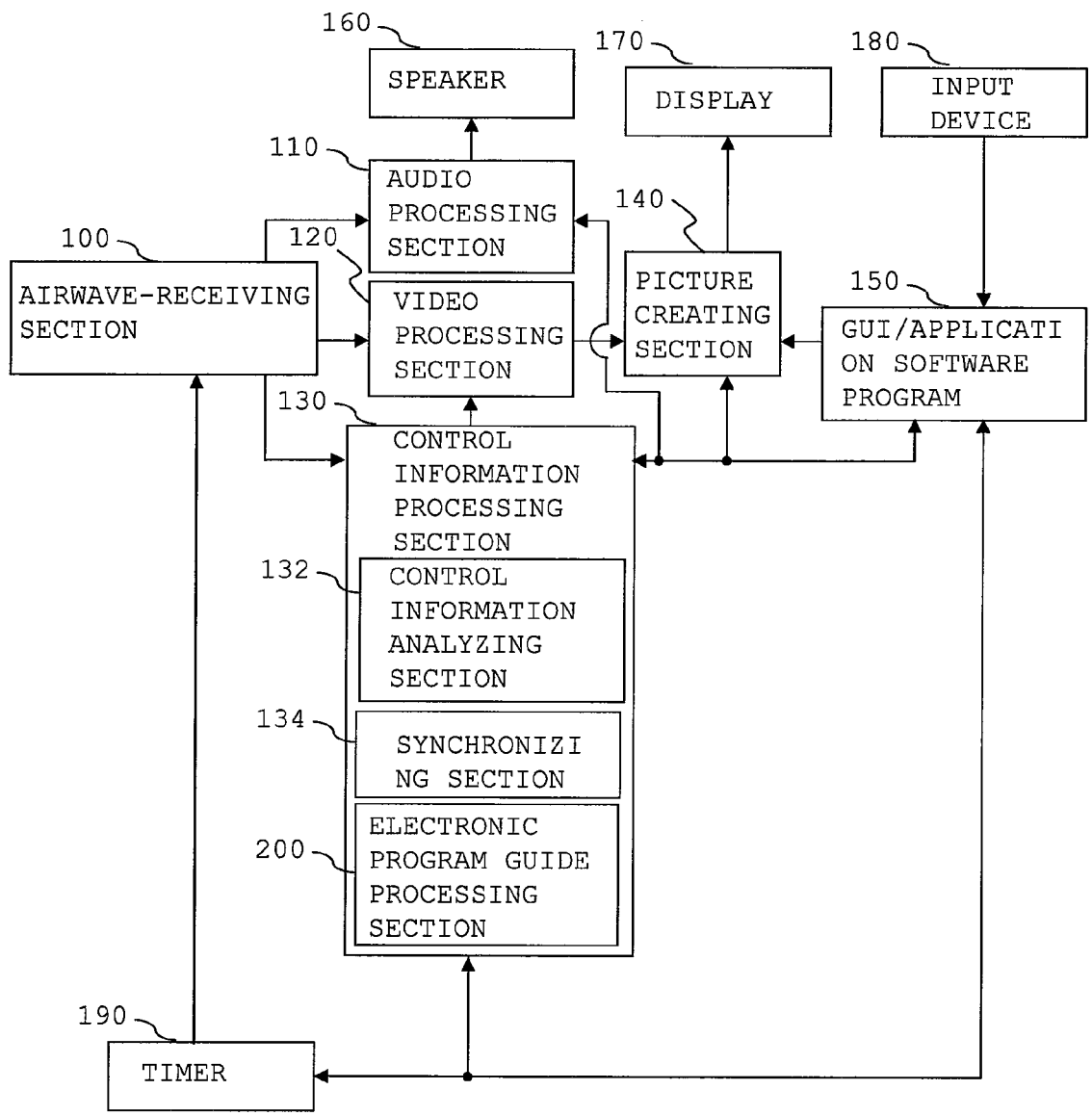

First the preferred embodiments of the invention herein disclosed will be outlined. Here, the reference numerals to refer to the drawings, which are accompanied with paired round brackets, only exemplify what the concepts of parts referred to by the numerals contain.

[1] The apparatus for processing EPG information (200) is one which accumulates EPG (Electronic Program Guide) information separated from received data of digital broadcast in a database on receipt of an input of the EPG information, and outputs EPG information read from the database according to an electronic program guide select direction for creation of a picture. The apparatus for processing EPG information has: an acquiring speed measuring section for measuring a speed of acquiring the EPG information; a supplying speed measuring section for detecting a speed of supplying information to create a picture of an electronic program guide; and a look-ahead control section for performing control to store the EPG information in the database in advance of display. The look-ahead control section refers to a result of measurement by the acquiring speed measuring section and a result of measurement by the supplying speed measuring section, and controls an amount of the information stored in advance of display so that the speed of acquiring the EPG information and the speed of supplying information to create a picture of an electronic program guide are kept in a predetermined relation.

According to this embodiment, in response to a direction for updating an electronic program guide, the apparatus for processing EPG information supplies EPG information corresponding to the direction and stores another piece of information associated with the EPG information in the database in advance of next display. The amount of information stored in advance is decided so that the acquiring speed and supplying speed can be kept in a predetermined relation. Therefore, the amount of information stored in advance is raised with increase in the frequency of using an electronic program guide in correlation with the supplying speed, and the amount of information stored in advance is decreased with decrease in the using frequency. Thus, it becomes possible to read in EPG information in advance of display without assuming that an input device such as a mouse is operated.

[2] In the apparatus for processing EPG information as stated in [1], when it is judged based on the results of measurements by the acquiring speed measuring section and supplying speed measuring section that the speed of acquiring EPG information is lower than the speed of supplying the information to create a picture of an electronic program guide, the look-ahead control section increases the amount of information stored in advance. Thus, supply of information required for displaying an electronic program guide can be prevented from being delayed.

[3] In the apparatus for processing EPG information as stated in [2], the look-ahead control section increases, in number, a linked hierarchical level targeted for storing in advance of a link destination linked with information of an electronic program guide being output at present thereby to increase an amount of information stored in advance. Thus, EPG information which is more likely to be displayed subsequently can be ensured previously.

[4] In the apparatus for processing EPG information as stated in [3], in case that EPG information to be output for creation of a picture cannot be acquired from the database, the look-ahead control section increases the amount of information stored in advance. It is conceivable that EPG information used for display can run out temporarily on the database depending on the condition of receiving data and the way an electronic program guide to be displayed is selected. However, the apparatus for processing EPG information can cope with such situation.

[5] In the apparatus for processing EPG information as stated in [4], in case that EPG information to be output for creation of a picture cannot be acquired from the database, the look-ahead control section increases, in number, a linked hierarchical level targeted for storing in advance of a link destination linked with information of an electronic program guide being output at present thereby to increase the amount of information stored in advance. Thus, EPG information which is more likely to be displayed can be ensured previously.

[6] In the apparatus for processing EPG information as stated in [5], the look-ahead control section progressively increases the amount of information stored in advance with increase in a duration during which a condition that EPG information to be output for creation of a picture cannot be acquired from the database lasts. Thus, the amount of acquired data can be increased according to a situation.

[7] In the apparatus for processing EPG information as stated in [6], the following are provided: an insufficient speed flag which reflects a result of judgment about whether or not the speed of acquiring EPG information is lower than the speed of supplying information to create a picture of an electronic program guide, the judgment made based on results of measurements by the acquiring speed measuring section and supplying speed measuring section; an insufficient data flag which reflects a result of judgment about whether or not EPG information to be output for creation of the picture can be acquired from the database; and an electronic program guide creating section which outputs information to create the picture based on EPG information read from the database according to an electronic program guide select direction. The look-ahead control section refers to the insufficient speed flag and insufficient data flag, and manipulates the insufficient speed flag. The electronic program guide creating section which outputs information to create the picture based on EPG information read from the database according to an EPG select direction manipulates the insufficient data flag.

[8] In the apparatus for processing EPG information as stated in [5], the look-ahead control section performs control so as to nullify EPG information on the database which has gone out of a linked hierarchical level targeted for storing in advance of information of an electronic program guide being output at present. Thus, the finite storage capacity of the database can be used effectively.

[9] In the apparatus for processing EPG information as stated in [8], the look-ahead control section sets EPG information in a hierarchical top linked level as an exception to the nullification. In this arrangement, it is given precedence to save time and labor to repeatedly acquire EPG information in the hierarchical top linked level, whose using frequency is higher.

[10] The system for receiving digital broadcasts has: an airwave-receiving section for receiving airwaves with EPG information multiplexed thereon; an audio processing section for decoding audio data received from the airwave-receiving section; a video processing section for decoding video data received from the airwave-receiving section; a control information processing section for analyzing control information received from the airwave-receiving section, associating the audio and video data with each other, performing synchronous control of the audio and video data, and processing information of an electronic program guide; a picture creating section for creating picture data based on outputs from the video processing section and control information processing section; and an input section operable to receive a direction from an input device and pass the direction to the control information processing section. The control information processing section has the apparatus for processing EPG information as described in [1]. The EPG information processing apparatus receives EPG information from the airwave-receiving section, and outputs EPG information for creation of a picture to the picture creating section.

[11] The method for processing EPG information is a method that EPG information separated from received data of digital broadcast is input and accumulated in a database, and the EPG information read from the database according to an EPG select direction is output for creation of a picture. The EPG information processing method includes: an acquiring speed measuring step of measuring a speed of acquiring EPG information; a supplying speed measuring step of detecting a speed of supplying information to create a picture of an electronic program guide; and a look-ahead control step of referring to a result of measurement according to the acquiring speed measuring step and a result of a measurement according to the supplying speed measuring step, and controlling an amount of the EPG information stored in the database prior to display so that the speed of acquiring EPG information and the speed of supplying information to create a picture of an electronic program guide are kept in a predetermined relation.

[12] In the method for processing EPG information as stated in [11], the look-ahead control step includes increasing an amount of information stored in advance when it is judged based on results of measurements according to the acquiring speed measuring step and supplying speed measuring step that the speed of acquiring EPG information is lower than the speed of supplying information to create a picture of an electronic program guide.

[13] In the method for processing EPG information as stated in [12], the look-ahead control step includes increasing, in number, a linked hierarchical level targeted for storing in advance of a link destination linked with information of an electronic program guide being output at present thereby to increase an amount of information stored in advance.

[14] In the method for processing EPG information as stated in [13], the look-ahead control step includes increasing the amount of information stored in advance when EPG information to be output for creation of a picture cannot be acquired from the database.

[15] In the method for processing EPG information as stated in [14], the look-ahead control step includes increasing, in number, a linked hierarchical level targeted for storing in advance of a link destination linked with information of an electronic program guide being output at present thereby to increase the amount of information stored in advance when EPG information to be output for creation of a picture cannot be acquired from the database.

[16] In the method for processing EPG information as stated in [15], the look-ahead control step includes progressively increasing the amount of information stored in advance with increase in a duration during which a condition that EPG information to be output for creation of a picture cannot be acquired from the database lasts.

[17] In the method for processing EPG information as stated in [15], the look-ahead control step includes performing control so as to nullify EPG information on the database which has gone out of a linked hierarchical level targeted for storing in advance of information of an electronic program guide being output at present.

[18] In the method for processing EPG information as stated in [17], the look-ahead controlling step includes setting EPG information in a hierarchical top linked level as exception to the nullification.

2. Detailed Description of the Embodiments

Now, further detailed descriptions of the embodiments will be presented. The preferred embodiments for carrying out the invention will be described below with reference to the accompanying drawings. It is noted that as to all the drawings to which reference is made in describing the preferred embodiments, the members having identical functions are identified by the same reference numeral, and the repeated description thereof is omitted.

FIG. 1 shows an example of a system for receiving digital broadcasts according to an embodiment of the invention. Airwaves carry audio data, video data, synchronous information of audio and video data, control information containing an electronic program guide, and others, which are packetized and delivered for each bundle of data. On Receipt of airwaves, the airwave-receiving section 100 discriminates multiplexed packets by use of identification information such as a header, and distributes the packets to processing sections of subsequent stages on the individual data type basis. The audio processing section 110 decodes audio data received from the airwave-receiving section 100, performs a treatment for increasing sound quality, DA (Digital-to-Analog) conversion and other processing, and then sends the resultant data to a speaker 160. The video processing section 120 decodes video data received from the airwave-receiving section 100, performs processes including color correction and scaling, and then sends the resultant data to the picture creating section 140. The picture creating section 140 combines video data received from the video processing section 120, information from GUI (Graphical User Interface) and a running application software program, EPG information received from the control information processing section 130 and other information to create data of a picture which a user will see, and sends the picture data to a display 170. At the time of sending data to the speaker 160 and display 170, synchronous control information supplied by the control information processing section 130, which is to be described later, is used to synchronize the audio data and video data so as not to cause the time difference in output timing between these data. The input device 180 is a means such as a keyboard, or touch panel, by which a user operates the system for receiving digital broadcasts. The information input through the input device 180 is sent to e.g. GUI or running application software program (GUI/application software) 150. Then, a user operation produces an effect on the system for receiving digital broadcasts, and the result is displayed on the display 170.

The control information processing section 130 analyzes and separates control information received from the airwave-receiving section 100, associates audio and video data mutually, exercises synchronous control thereon, creates an electronic program guide, and performs other things. On receipt of control information from the airwave-receiving section 100, the control information processing section 130 analyzes the received data in the control information analyzing section 132, and distributes the data appropriately to functional blocks in the control information processing section. For example, the data used to synchronize audio and video data is sent to the synchronizing section 134, and the data forming a base of an electronic program guide is sent to the EPG processing section 200. Although this is not shown in the drawing particularly, the control information processing section 130 has a storage device, such as ROM (Read Only Memory) and RAM (Random Access Memory), as well as a microprocessor including CPU (Central Processing Unit) and others, and it executes a predetermined program thereby to perform required data processing under the control of OS (Operating System).

The timer 190 serves for processing which requires handling a point/length of time. The timer 190 is used, for example, when a time stamp contained in received information is treated in the airwave-receiving section 100, and when the synchronizing section 134 performs the synchronization in the control information processing section 130. Now, it is noted that the timer 190 may include a real-time clock, which is a timepiece operable to control date and time. This is because a real-time clock can be materialized according to the same mechanism as that for timers.

Figure 2:
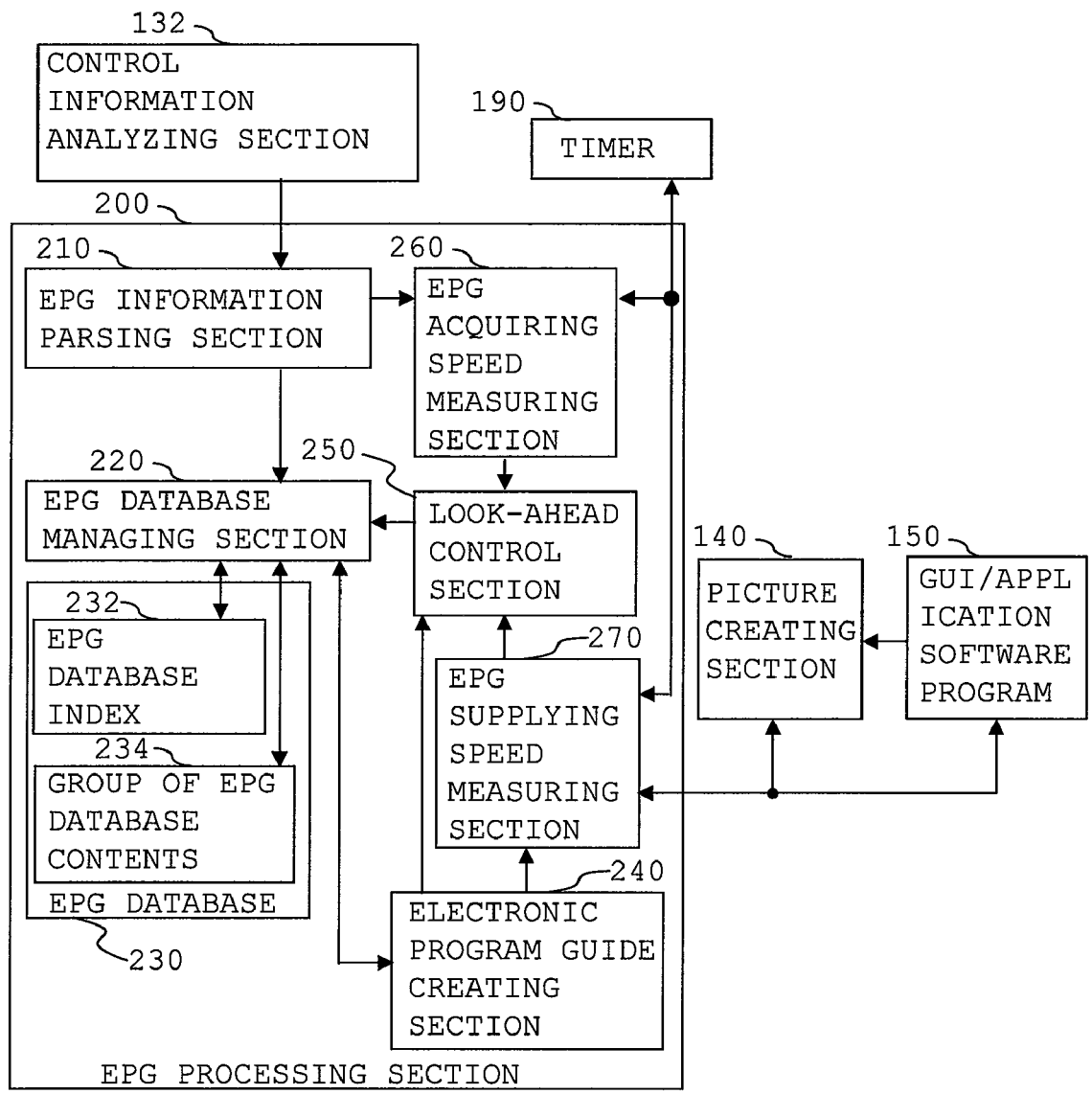
FIG. 2 is a block diagram showing an example of the basic configuration of an EPG processing section of the system for receiving digital broadcasts.

FIG. 2 shows an example of the configuration of the EPG processing section 200 according to an embodiment of the invention. The original data of an electronic program guide received through the control information analyzing section 132 is converted into a data form which can be used as an electronic program guide in the EPG information parsing section 210. Then, the EPG database managing section 220 manages the electronic program guide DB 230. Now, the word "database" is sometimes abbreviated to "DB" herein and in the accompanying drawings. The EPG database 230 includes an EPG database index 232 and EPG database contents 234. The EPG database managing section 220 prepares an entry list of the EPG database for the EPG database index 232, organizes correlations in the index, and stores an element of an electronic program guide corresponding to each entry in the group of EPG database contents 234. The electronic program guide, which a user will see, is created by the EPG creating section 240. The EPG creating section 240 extracts, from the EPG database 230, only information supplied to a user, such as the information to be displayed in a picture to create an electronic program guide, and supplies the electronic program guide to the picture creating section 140 and GUI/application software program 150. The picture creating section 140 acquires only data to be displayed on the display 170 from the EPG creating section 240, and uses the data to create a picture.

The EPG acquiring speed measuring section 260 monitors the EPG information parsing section 210 to measure a speed of acquiring EPG information forming a base of an electronic program guide, which is received from the control information analyzing section 132. The speed of acquiring EPG information thus measured is supplied to a look-ahead control section 250.

Figure 8:
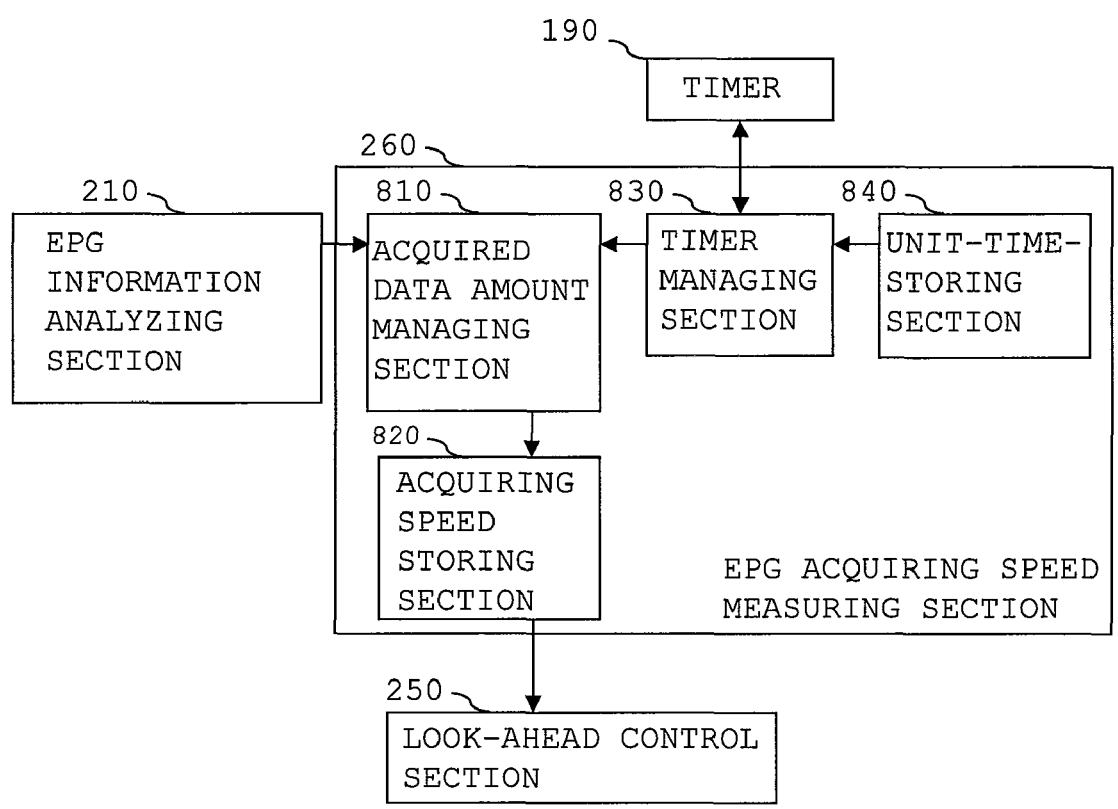
FIG. 8 is a block diagram showing an example of the configuration of an EPG acquiring speed measuring section of the EPG processing section.

FIG. 8 shows an example of the configuration of the EPG acquiring speed measuring section 260. The control information analyzing section 132 notifies the information about where to store data and the size thereof at the time of sending the data to the EPG information parsing section 210. The acquired data amount managing section 810 in the EPG acquiring speed measuring section 260 accepts input of the data size from the EPG information parsing section 210. The acquired data amount managing section 810 adds up data sizes input for each period with a length corresponding to a value set in the unit-time-storing section 840, calculates the amount of data acquired for the unit time, i.e. the data acquiring speed, and stores it in the acquiring speed storing section 820.

The timer managing section 830 uses a setting value in the unit-time-storing section 840 to control the timer 190. The way of controlling the timer 190 depends on the function of the timer 190. For example, in case that the timer 190 has the function of making a request for interruption periodically for each set period, a setting value in the unit-time-storing section 840 is set as the interval of the request for interruption, and the interruption is utilized to notify the acquired data amount managing section 810 of the unit time. The unit-time-storing section 840 is arranged so that a variable can be stored therein as a setting value.

As the EPG acquiring speed measuring section 260 achieves periodic measurement of the speed of acquiring EPG information in this way, it becomes to cope with the change in the speed of acquiring an electronic program guide, which varies every moment depending on the radio field intensity of received airwaves, the frequency of multiplexing of EPG data in airwaves, the degree of processing load on the system for receiving digital broadcasts, and other factor.

Further, the EPG supplying speed measuring section 270 monitors the EPG creating section 240 to measure the speed of supplying EPG information which is required according to a user operation. The measured speed of supplying EPG information is furnished to the look-ahead control section 250.

FIG. 9 shows an example of the configuration of the EPG supplying speed measuring section 270. The EPG creating section 240 notifies the information about where to store supplied data and the size thereof at the time of sending the data to the picture creating section 140. The supplied data amount managing section 910 in the EPG supplying speed measuring section 270 accepts input of the data size from the EPG creating section 240. The supplied data amount managing section 910 adds up data sizes input for each period with a length corresponding to a value set in the unit-time-storing section 940, calculates the amount of data supplied for the unit time, i.e. the data supplying speed, and stores it in the supplying speed storing section 920. At this time, the setting value in the unit-time-storing section 940 is set to, for example, the same value as that in the unit-time-storing section 840 in the EPG acquiring speed measuring section 260.

The timer managing section 930 uses the setting value in the unit-time-storing section 940 to control the timer 190. The controlling method is materialized by the same function as that of the timer managing section 830 in the EPG acquiring speed measuring section 260. The timer managing section 830 and unit-time-storing section 840 in the EPG acquiring speed measuring section 260 are exactly the same in function as the timer managing section 930 and unit-time-storing section 940 in the EPG supplying speed measuring section. Therefore, the timer managing sections and unit-time-storing sections may be separated from the EPG acquiring speed measuring section 260 and EPG supplying speed measuring section 270, and arranged as independent functional blocks shared by these sections.

In this way, the EPG supplying speed measuring section 270 can performs the measurement of the supplying speed for each unit time from the data in connection with overwrite of an electronic program guide displayed on the display by the picture creating section 140 according to a user operation, namely from the amount of data supplied to the picture creating section 140 by the EPG creating section 240. From the speed of supplying EPG information, it becomes possible to indirectly monitor the user operation frequency. The user operation frequency differs from user to user. For example, it varies depending on the way a user sees an electronic program guide, e.g. whether a user has a good look at or glances over an electronic program guide. Further, the amount of data supplied at the time of update of the electronic program guide varies every time. Therefore, it becomes necessary to use the function of the EPG supplying speed measuring section 270 to periodically measure the speed of supplying an electronic program guide.

The look-ahead control section 250 compares a value stored in the acquiring speed storing section 820, which is an EPG acquisition speed measured by the EPG acquiring speed measuring section 260, with a value stored in the supplying speed storing section 920, which is an EPG supplying speed measured by the EPG supplying speed measuring section 270, and decides, from the result of the comparison, the data to look ahead so that EPG data required by a user can be always acquired prior to (or looked ahead of) the EPG database 230. In other words, the look-ahead control section 250 refers to the result of measurement by the EPG acquiring speed measuring section 260 and the result of measurement by the EPG supplying speed measuring section 270, and makes the decision so that the speed of acquiring EPG information and the speed of supplying information for creating a picture of an electronic program guide is maintained in a predetermined relation. Specifically, the look-ahead control section 250 increases the amount of EPG information to acquire in advance when the supplying speed in correlation with the frequency of using an electronic program guide increases, and decreases the amount of EPG information to acquire in advance when the supplying speed in correlation with the using frequency decreases.

Now, the constitutional concept of an electronic program guide, the method for deciding data to look ahead, and the function of the look-ahead control section 250 in connection with an embodiment of the invention will be described with reference to FIGS. 3 to 6.

Figure 3:
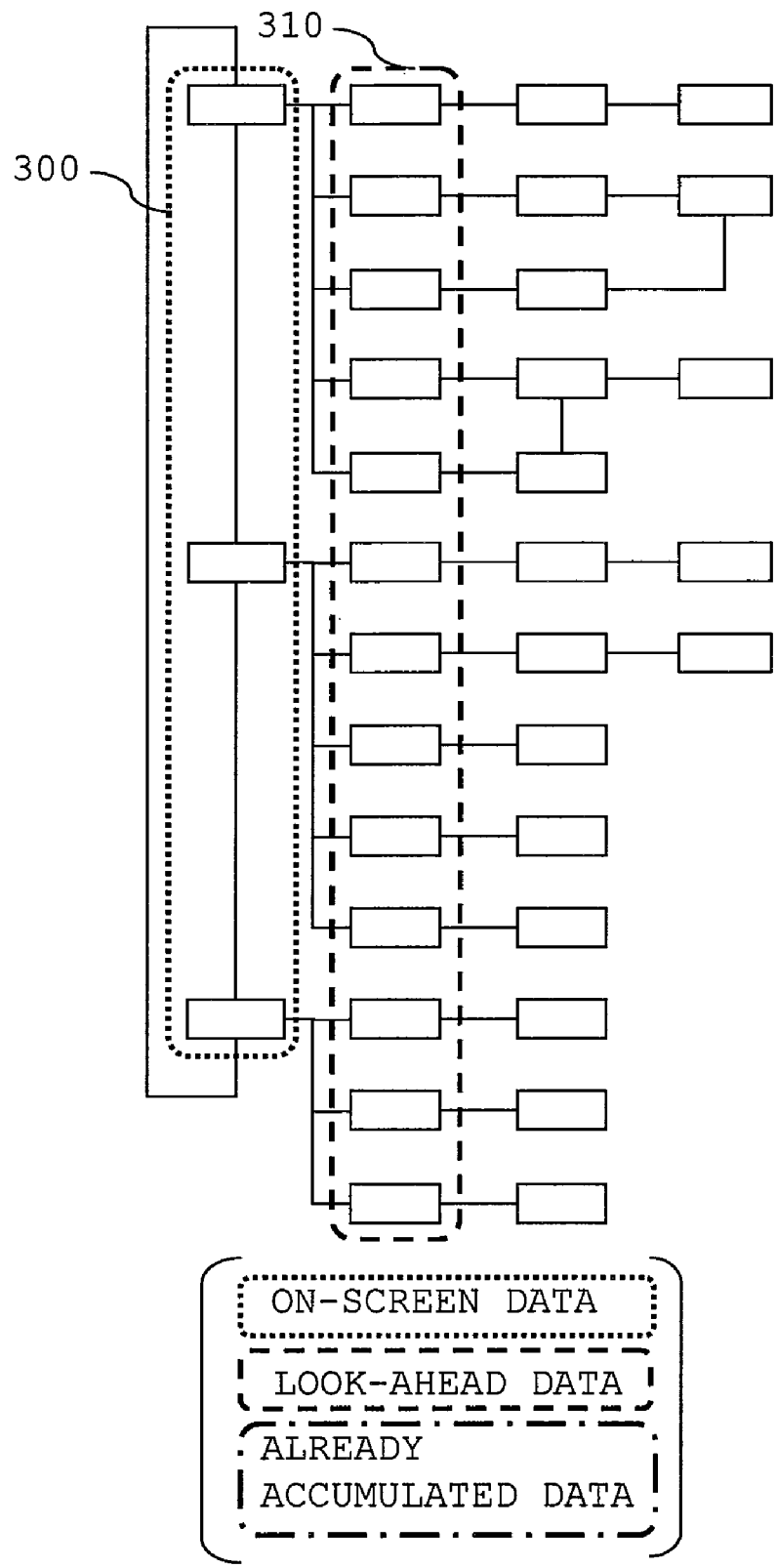
FIG. 3 is an illustration for explaining the structure of an electronic program guide and details of processing of the elements thereof, showing a first condition.

FIG. 3 diagrammatically shows a structure of the electronic program guide. In the drawing, each unfilled rectangle represents an element of an electronic program guide, and a solid line connecting between unfilled rectangles means the link lying between the elements. In the respective elements, information pieces concerning a channel and a program, such as the name, title, and start and finish times and participants of a program, the language used therein, and its viewing fee, are present independently of each other, or classified and stored in some information groups. While this is not shown in the drawing to avoid making it complicated, the individual elements are linked to an element at a top level in the hierarchy.

The construction of links between the elements as shown in FIG. 3 can be seen from the EPG database index 232 produced in case that the EPG database managing section 220 forms the EPG database 230. As to each content in the group of EPG database contents 234, which is a substance of an electronic program guide, only the content corresponding to a required element of the EPG database index 232 is accumulated in the group of EPG database contents according to a direction by the look-ahead control section 250.

The on-display data 300 in the drawing represents a part of the whole electronic program guide, which is being displayed on the display. The on-screen data 300 is decided depending on the data which the EPG creating section 240 has supplied to the picture creating section 140. The example of FIG. 3 is based on an initial condition immediately after an electronic program guide is displayed, and each element at the top level in the hierarchy forms one piece of the on-screen data 300. In this situation, a one-step-lower link destination element of the on-screen data 300 fits the data to look ahead. Hence, in the situation of FIG. 3, the look-ahead data 310 is as shown in the drawing. The look-ahead control section 250 refers to the EPG database index 232 to decide the look-ahead data 310, and then directs the EPG database control section 220 to accumulate the look-ahead data 310 in the group of EPG database contents 234. Thus, in the situation of FIG. 3, the on-screen data 300 and look-ahead data 310 are stored as EPG database contents 234.

Figure 4:
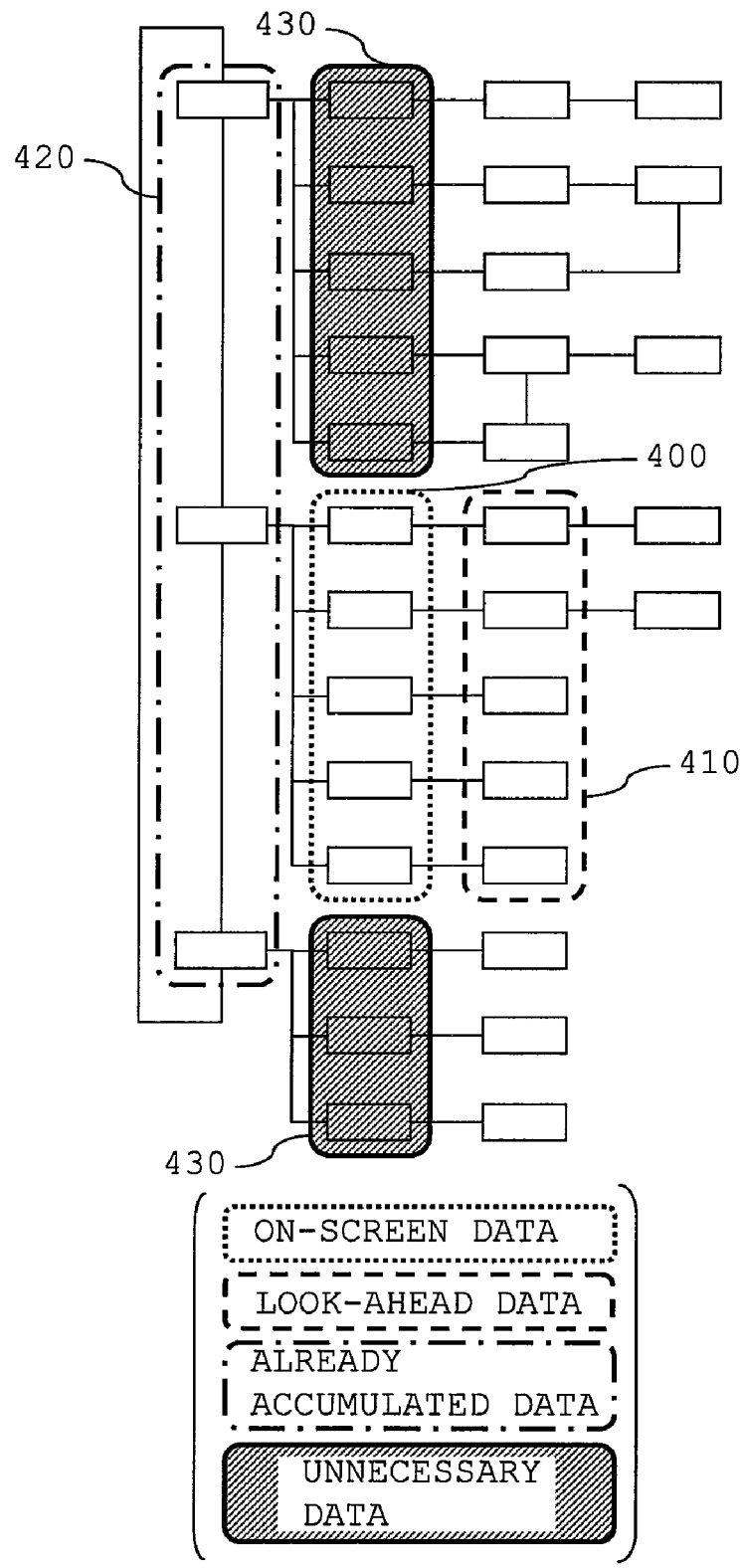
FIG. 4 is an illustration for explaining the structure of an electronic program guide and details of processing of the elements thereof, showing a second condition.

FIG. 4 shows a situation that of the on-screen data 300 as shown in FIG. 3, a certain element has been selected, and thus the on-screen data 300 has been changed to the on-screen data 400. The selection of an element is performed by the input device 180, and this direction thus input is sent to the EPG processing section 200 through the GUI/application software program 150. As a result, an element higher or lower than the on-screen data 400 by one level in the hierarchy becomes the data to look subsequently. In case that the data to look subsequently is set to be an element lower by one level in the hierarchy, the look-ahead data 410 is decided by the look-ahead control section 250 and accumulated in the group of EPG database contents 234 as described with reference to FIG. 3. In case that the data to look subsequently is set to be an element higher by one level in the hierarchy, as the data of the one-level higher element has been already accumulated in the group of EPG database contents 234 in the situation of FIG. 3, the data of the one-level higher element (already accumulated data 420) is still kept in the group of EPG database contents 234. As to the data 430, which has been accumulated as a content of the EPG database in the situation of FIG. 3, but made unnecessary in the situation as shown in FIG. 4, the look-ahead control section 250 directs the EPG database managing section 220 to delete or nullify the data.

Figure 5:
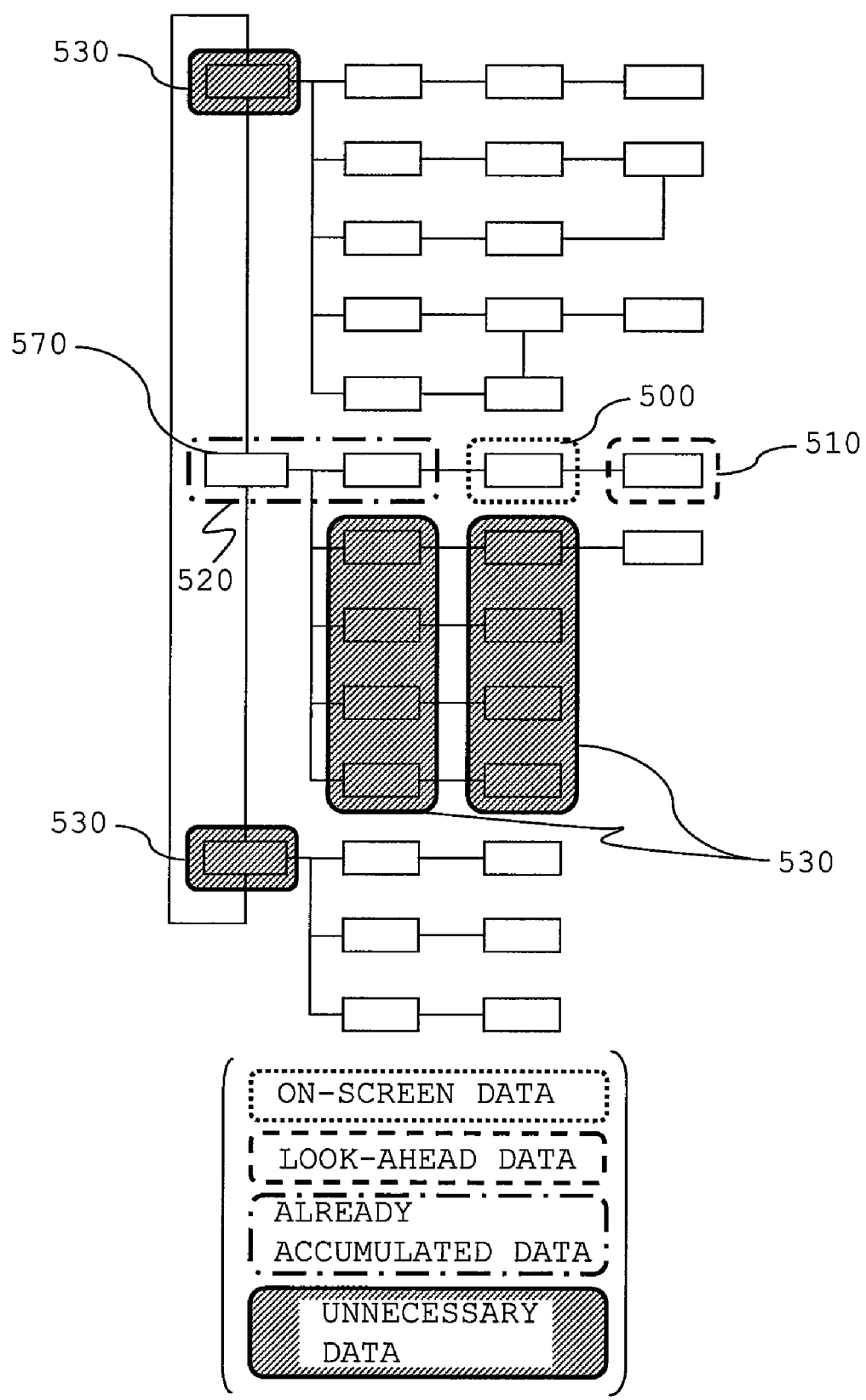
FIG. 5 is an illustration for explaining the structure of an electronic program guide and details of processing of the elements thereof, showing a third condition.

FIG. 5 shows a situation that of the on-screen data 400 as shown in FIG. 4, a certain element has been selected, and thus the on-screen data 400 has been changed to the on-screen data 500. As shown in FIGS. 3 and 4, the look-ahead data 510, already accumulated data 520 and unnecessary data 530 are as shown in the drawing. The element 570 is a link destination of the on-screen data 500 located at the top level in the hierarchy. Therefore, the look-ahead control section 250 does not judge the element 570 to be unnecessary data, and handles the element as already accumulated data. However, in this connection, no special restriction is intended. The look-ahead control section 250 may be provided with a function which can prohibit delete and nullification of data for which it is preferable to be left accumulated in the group of EPG database contents 234 at all times because of the higher frequency of use, such as all the elements at the top level in the hierarchy, and which can set such data as data to protect. In this case, the resultant protected data can be specified by a designation equivalent to or comparable with the name of each entry of the EPG database index 232.

Now, FIG. 6 shows an example of setting the protected data. An element set as protected data 640 is left held in the group of EPG database contents 234 even after the element has been judged to be unnecessary data in the situation of FIG. 5. Now, it is noted that the element 570 as shown in FIG. 5 may be handled as unnecessary data.

The constitutional concept of an electronic program guide, the method for deciding data to look ahead, and the function of the look-ahead control section 250 in connection with an embodiment of the invention have been described above with reference to FIGS. 3 to 6, in which the location of data to look ahead is fixed at a level higher or lower than the on-screen data by one level in the hierarchy. This is effective, for example, in case that the speed of acquiring an electronic program guide measured by the EPG acquiring speed measuring section 260 is higher than the speed of supplying an electronic program guide measured by the EPG supplying speed measuring section 270 at all times.

Figure 7:
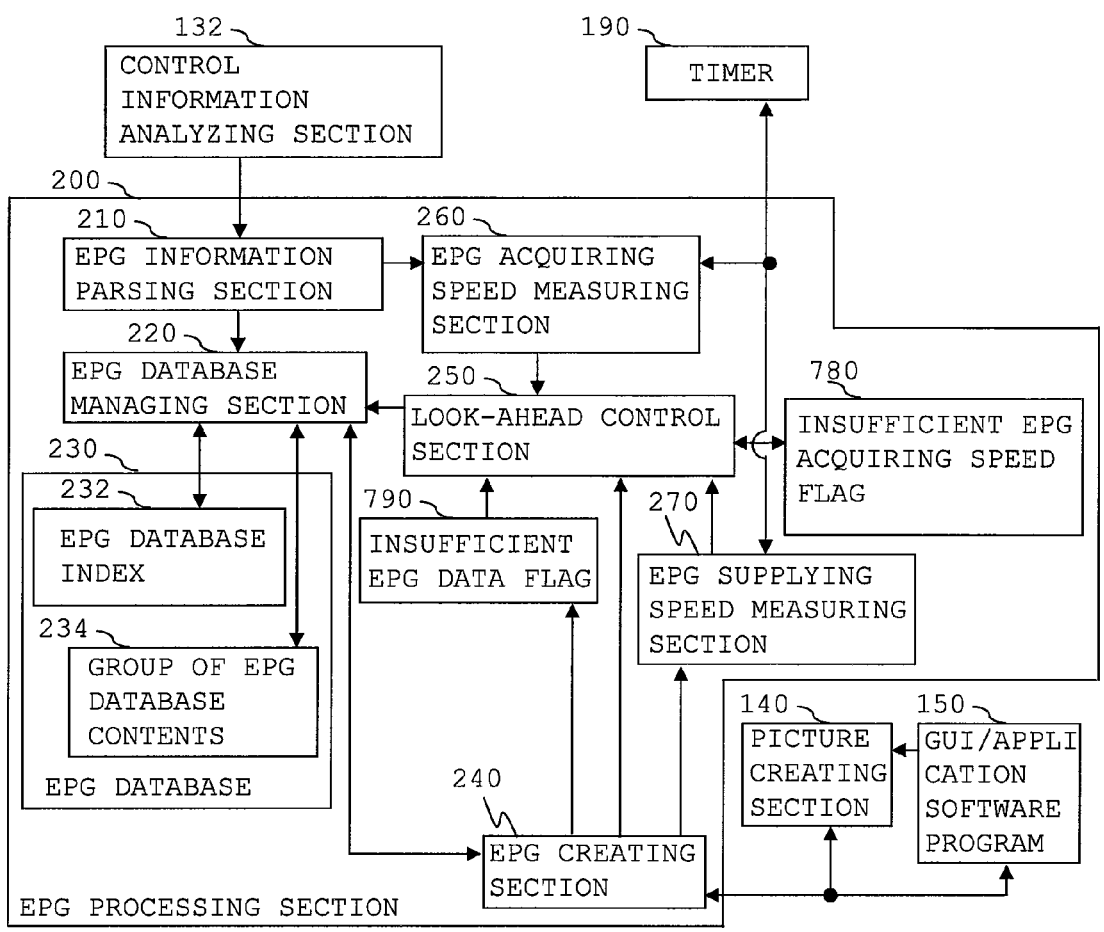
FIG. 7 is a block diagram showing an example of the configuration of the EPG processing section expanded in function.

However, in cases that the speed of acquiring an electronic program guide is lower than the speed of supplying an electronic program guide, and that the relation of the acquiring and supplying speeds is reversed instantaneously although the acquiring speed is higher than the supplying speed on average, it can fail to take data into the group of EPG database contents 234 in time, delaying supplying an electronic program guide. To perform control which can cope with such cases effectively, the EPG processing section 200 as shown in FIG. 2 is modified in configuration. FIG. 7 presents an example of such modification, and shows an example of the configuration for performing look-ahead control, in which an insufficient EPG acquiring speed flag 780 and an insufficient EPG data flag 790 are introduced.

In the example as shown in FIG. 7, the look-ahead control section 250 which accepts, as inputs, monitoring results of the speeds sets the insufficient EPG acquiring speed flag 780 to "Valid" in case that the speed of acquiring an electronic program guide measured by the EPG acquiring speed measuring section 260 is lower than the speed of supplying an electronic program guide measured by the EPG supplying speed measuring section 270.

When the insufficient EPG acquiring speed flag 780 is brought to "Valid", the look-ahead control section 250 expands the scope from which an element to look ahead is chosen by one level upward and/or downward with respect to the hierarchical level to which the on-screen data belongs. Specifically, if the ordinal number of the hierarchical level to which an element to look ahead belongs with respect to the level of the on-screen data is first upward and/or downward, the scope from which the element to look ahead is chosen is expanded to the second level upward and/or downward; if the ordinal number of the hierarchical level to which an element to look ahead belongs with respect to the level of the on-screen data is second upward and/or downward, the scope from which the element to look ahead is chosen is expanded to the third level upward and/or downward. Thus, the amount of data accumulated in the group of EPG database contents 234 by looking ahead is increased, whereby data which the EPG creating section 240 uses to creates an electronic program guide can be prevented from running out.

The insufficient EPG acquiring speed flag 780 is set to "Invalid" by the look-ahead control section 250 at the time when the speed of acquiring an electronic program guide measured by the EPG acquiring speed measuring section 260 exceeds the speed of supplying an electronic program guide measured by the EPG supplying speed measuring section 270.

In case that after the insufficient EPG acquiring speed flag 780 has been made "Invalid", the condition that the insufficient EPG data flag to be described later has been in "Invalid" for a certain length of time, the look-ahead control section 250 decreases, by one, the ordinal number of the outermost hierarchical level in the scope from which an element to look ahead is chosen, and then monitors how the flags change with time. In case that the insufficient EPG acquiring speed flag 780 and insufficient EPG data flag 790 are both in "Invalid" after an elapse of time, the look-ahead control section 250 repeats execution of control including the following two actions until the ordinal number of the outermost hierarchical level in the scope from which an element to look ahead is chosen reaches first. The first action is decreasing, by one, the ordinal number of the outermost hierarchical level in the scope from which an element to look ahead is chosen, and the second action is monitoring how the flags change with time.

In contrast, in case that the insufficient EPG acquiring speed flag has not been in "Invalid" after the elapsed of time, the look-ahead control section 250 further increases, by one, the ordinal number of the outermost hierarchical level in the scope from which an element to look ahead is chosen.

In case of attempting to create an electronic program guide to be supplied to the picture creating section 140 and GUI/application software program 150, the EPG creating section 240 cannot acquire required data from the EPG database 230, i.e. the data used to create an electronic program guide has run out, the EPG creating section 240 sets the insufficient EPG data flag 790 to "Valid".

When the insufficient EPG data flag 790 is made "Valid", the look-ahead control section 250 increases, by e.g. one, the ordinal number of the outermost hierarchical level in the scope from which an element to look ahead is chosen thereby to attempt to resolve running out of data. After an elapse of time, the degree of running out of EPG data is made smaller, and it becomes possible to acquire the required data from the EPG database 230, the EPG creating section 240 sets the insufficient EPG data flag 790 to "Invalid". Thereafter, the EPG creating section 240 repeats a series of the actions as described above until the ordinal number of the outermost hierarchical level in the scope from which an element to look ahead is chosen reaches first. In case that the insufficient EPG data flag 790 has been in "Valid" even after an elapse of time, the look-ahead control section 250 further increases, by one, the ordinal number of the outermost hierarchical level in the scope from which an element to look ahead is chosen.

The insufficient EPG data flag 790 as described above is used to lighten the failure caused by an instantaneous increase in the supplying speed, which cannot be found out only by comparing the speed of acquiring an electronic program guide with the speed of supplying an electronic program guide.

While in the above-described embodiments, the number of elements to look ahead, which the look-ahead control section 250 uses in looking data ahead, is at least one. However, the number may be set to two or a larger value. The reason for this is to cope with e.g. a situation such that it has been already found that only one element to look ahead does not suffice in terms of a whole system.

As described above, the EPG processing section compares the speed of acquiring an electronic program guide with the speed of supplying the electronic program guide, which indicates the frequency of using the acquired electronic program guide to control the amount of EPG data looked ahead. Such EPG processing section makes it possible to realize look-ahead control without depending on an input device. Thus, also in regard to consumer-oriented and mobile devices, which are designed in view of using no mouse, an effective look-ahead function can be materialized.

While the invention made by the inventor has been described above specifically based on the embodiments, the invention is not so limited. It is needless to say that various changes and modifications may be made without departing from the subject matter hereof. The invention is applicable to various fields of digital broadcasts including ground-wave broadcast and satellite broadcast and cable television.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications within the ambit of the appended claims.

What is claimed is:

1. An apparatus for processing electronic program guide information which is capable of creating an electronic program guide for display from the electronic program guide information extracted from received airwaves, comprising:
   a control information analyzing section for converting electronic program guide information extracted from the received airwaves into electronic program guide information data which can be used as an electronic program guide;
   an electronic program guide database for storing the electronic program guide information data converted by the control information analyzing section;
   an electronic program guide creating section for creating electronic program guide data to be displayed from the electronic program guide information data stored in the electronic program guide database;
   an acquiring speed measuring section for measuring a quantity of the electronic program guide information acquired by the control information analyzing section per unit time as an acquiring speed;
   a supplying speed measuring section for measuring a quantity of the electronic program guide data to be displayed which is created by the electronic program guide creating section per unit time as a supplying speed; and
   a look-ahead control section for storing the electronic program guide information data into the electronic program guide database in advance of the electronic program guide data being displayed,
   wherein the look-ahead control section refers to the acquiring speed and the supplying speed, and increases an amount of electronic program guide information data acquired by the control information analyzing section when the supplying speed increases and decreases the amount of electronic program guide information data acquired by the control information analyzing section when the supplying speed decreases so that the acquiring speed and the supplying speed are kept in a predetermined relation.

2. The apparatus for processing electronic program guide information according to claim 1, wherein the look-ahead control section increases, in number, a linked hierarchical level targeted for storing in advance of a link destination linked with information of the electronic program guide presently being output, thereby to increase an amount of information stored in advance.

3. The apparatus for processing electronic program guide information according to claim 2, wherein in case that electronic program guide data to be output for creation of a picture of the electronic program guide cannot be acquired from the database, the look-ahead control section increases the amount of information stored in advance.

4. The apparatus for processing electronic program guide information according to claim 3, wherein in case that electronic program guide information data to be output for creation of the picture cannot be acquired from the database, the look-ahead control section increases, in number, a linked hierarchical level targeted for storing in advance of a link destination linked with information of an electronic program guide being output at present thereby to increase the amount of information stored in advance.

5. The apparatus for processing electronic program guide information according to claim 4, wherein the look-ahead control section progressively increases the amount of information stored in advance with an increase in a duration during which a condition that electronic program guide data to be output for creation of the picture cannot be acquired from the electronic program guide database lasts.

6. The apparatus for processing electronic program guide information according to claim 4, wherein the look-ahead control section performs control so as to nullify electronic program guide information data in the electronic program guide database which has gone out of a linked hierarchical level targeted for storing in advance of information of an electronic program guide which is presently output.

7. The apparatus for processing electronic program guide information according to claim 5, further comprising:
   an insufficient speed flag which reflects a result of judgment about whether or not the acquiring speed is lower than the supplying speed; and
   an insufficient data flag which reflects a result of judgment about whether or not electronic program guide data to be displayed for creation of a picture can be acquired from the electronic program guide database;
   wherein the look-ahead control section refers to the insufficient speed flag and insufficient data flag, and manipulates insufficient speed flag, and
   the electronic program guide creating section manipulates the insufficient data flag.

8. The apparatus for processing electronic program guide information according to claim 6, wherein the look-ahead control section sets electronic program guide information data in a hierarchical top linked level as exception to the nullification.

9. A system for receiving digital broadcasts, comprising:
   an airwave-receiving section for receiving airwaves with electronic program guide information multiplexed thereon;
   an audio processing section for decoding audio data received from the airwave-receiving section;

a video processing section for decoding video data received from the airwave-receiving section;

a control information analyzing section for analyzing control information received from the airwave-receiving section, performing synchronous control of the audio data and the video data, and converting electronic program guide information extracted from the received airwaves into converting electronic program guide information data which can be used as an electronic program guide;

an electronic program guide database for storing the electronic program guide information data converted by the control information analyzing section;

an electronic program guide creating section for creating the electronic program guide data to be displayed from the electronic program guide information data stored in the electronic program guide database;

a picture creating section for creating picture data based on outputs from the video processing section and control information analyzing section; and an input section operable to receive a direction from an input device and pass the direction to the control information analyzing section, wherein the control information analyzing section has an electronic program guide information processing apparatus operable to accumulate the electronic program guide information data in the electronic program guide database, wherein the electronic program guide information processing apparatus has: an acquiring speed measuring section for measuring a quantity of the electronic program guide information acquired by the control information analyzing section per unit time as an acquiring speed; a supplying speed measuring section for measuring a quantity of the electronic program guide data to be displayed which is created by the electronic program guide creating section per unit time as a supplying speed; and a look-ahead control section for performing control to store the electronic program guide information data into the electronic program guide database in advance of being displayed, wherein the look-ahead control section refers to the acquiring speed and the supplying speed, and controls to increase the amount of electronic program guide information data acquired by the control information analyzing section when the supplying speed increases and controls to decrease the amount of electronic program guide information data acquired by the control information analyzing section when the supplying speed decreases so that the acquiring speed and the supplying speed are kept in a predetermined relation, and wherein the electronic program guide information processing apparatus receives electronic program guide information from the airwave-receiving section, and outputs electronic program guide data to create a picture of the electronic guide program in the picture creating section.

10. A method for processing electronic program guide information which is capable of creating an electronic program guide for display from the electronic program guide information extracted from received airwaves, comprising:

converting electronic program guide information extracted from the received airwaves into electronic program guide information data which can be used as an electronic program guide;

storing the electronic program guide information data into an electronic program guide database;

creating electronic program guide data to be displayed from the electronic program guide information data stored in the electronic program guide database;

measuring a speed-quantity of the converted electronic program guide information per unit time as an acquiring speed;

measuring a quantity of the created electronic program guide data to be displayed per unit time as a supplying speed; and looking-ahead to store the electronic program guide information data in the electronic program guide database in advance of the electronic program guide data being displayed, wherein the acquiring speed and the supplying speed are referenced such that an amount of the converted electronic program guide information data is increased when the supplying speed increases and decreases the amount of converted electronic program guide information data when the supplying speed decreases while keeping the acquiring speed and the supplying speed in a predetermined relation.

11. The method for processing electronic program guide information according to claim 10, wherein the looking-ahead includes increasing, in number, a linked hierarchical level targeted for storing in advance of a link destination linked with information of the electronic program guide which is presently output, thereby to increase an amount of information stored in advance.

12. The method for processing electronic program guide information according to claim 11, wherein the looking-ahead includes increasing the amount of information stored in advance when the electronic program guide data to be output for creation of a picture of the electronic guide program cannot be acquired from the electronic program guide database.

13. The method for processing electronic program guide information according to claim 12, wherein the looking-ahead includes increasing, in number, a linked hierarchical level targeted for storing in advance of a link destination linked with information of the electronic program guide which is presently output, thereby to increase the amount of information stored in advance when the electronic program guide data to be output for creation of the picture cannot be acquired from the electronic program guide database.

14. The method for processing electronic program guide information according to claim 13, wherein the looking-ahead includes progressively increasing the amount of information stored in advance with an increase in a duration during which a condition that electronic program guide data to be output for creation of the picture cannot be acquired from the electronic program guide database lasts.

15. The method for processing electronic program guide information according to claim 13, wherein the looking-ahead includes performing control so as to nullify electronic program guide information on the electronic program guide database which has gone out of a linked hierarchical level targeted for storing in advance of information of the electronic program guide which is presently output.

16. The method for processing electronic program guide information according to claim 15, wherein the looking-ahead includes setting electronic program guide information in a hierarchical top linked level as exception to the nullification.

* * * * *